US008832207B2

(12) United States Patent
Joslyn

(10) Patent No.: US 8,832,207 B2
(45) Date of Patent: Sep. 9, 2014

(54) METHOD FOR IDENTIFYING CLIENT STATION ASSOCIATION IN A COMMUNICATION SYSTEM

(75) Inventor: Donald L. Joslyn, Debary, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 1050 days.

(21) Appl. No.: 12/796,053

(22) Filed: Jun. 8, 2010

(65) Prior Publication Data

US 2011/0302252 A1 Dec. 8, 2011

(51) Int. Cl.
*G06F 15/16* (2006.01)
(52) U.S. Cl.
USPC ........... 709/206; 709/220; 709/222; 709/224; 370/235; 370/331; 370/389
(58) Field of Classification Search
USPC .......... 709/206, 223, 224, 222, 220; 370/235, 370/331, 338, 389, 392
See application file for complete search history.

(56) References Cited

U.S. PATENT DOCUMENTS

2013/0055358 A1* 2/2013 Short et al. ........................ 726/4

* cited by examiner

*Primary Examiner* — Thu Ha Nguyen
(74) *Attorney, Agent, or Firm* — Randi L. Karpinia; Steven A. May

(57) ABSTRACT

A communication system comprises an access point and one or more client stations associated with the access point. The access point maintains a simple network management protocol (SNMP) table including a respective media access control (MAC) address for each of one or more client stations associated with the access point. In accordance with some embodiments, the access point receives a SNMP request message including a MAC address of the client station for which the association is to be identified. The access point then identifies the association of the client station by searching the SNMP table for the MAC address of the client station for which the association is to be identified. Further, the access point sends a reply message identifying the association of the client station with the access point when the SNMP table includes the MAC address of the client station.

20 Claims, 6 Drawing Sheets

US 8,832,207 B2

METHOD FOR IDENTIFYING CLIENT STATION ASSOCIATION IN A COMMUNICATION SYSTEM

FIELD OF THE DISCLOSURE

The present disclosure relates generally to a communication system and more particularly to a method for identifying a client station association in a communication system.

BACKGROUND

A wireless communication system typically includes a communication network with fixed and wired gateways. Many wireless communication systems employ a client station which communicates with an access point that is coupled to a wired network. Wide area networks employ a plurality of such access points communicatively coupled to each other either directly or indirectly over a particular geographical area. Each access point has one or more associated client stations to which it provides communication service in a given coverage area. The client station can move geographically while it is communicating over a wireless link to the access point. When the client station moves out of range of one access point, it may connect or perform a "handover" to a new access point and continue communicating with the wired network through the new access point. Each access point stores information regarding all the currently associated client stations, for example, in an association table. In such communication systems it can be challenging to determine an access point to which a particular client station is currently associated. One method to find the access point to which the particular client station is associated is to scan the association table of every access point in the communication system. However, this method is not efficient for use in the wide area network comprising hundreds of such access points.

Thus, there exists a need for a more efficient method to find an access point to which a particular client station is associated.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
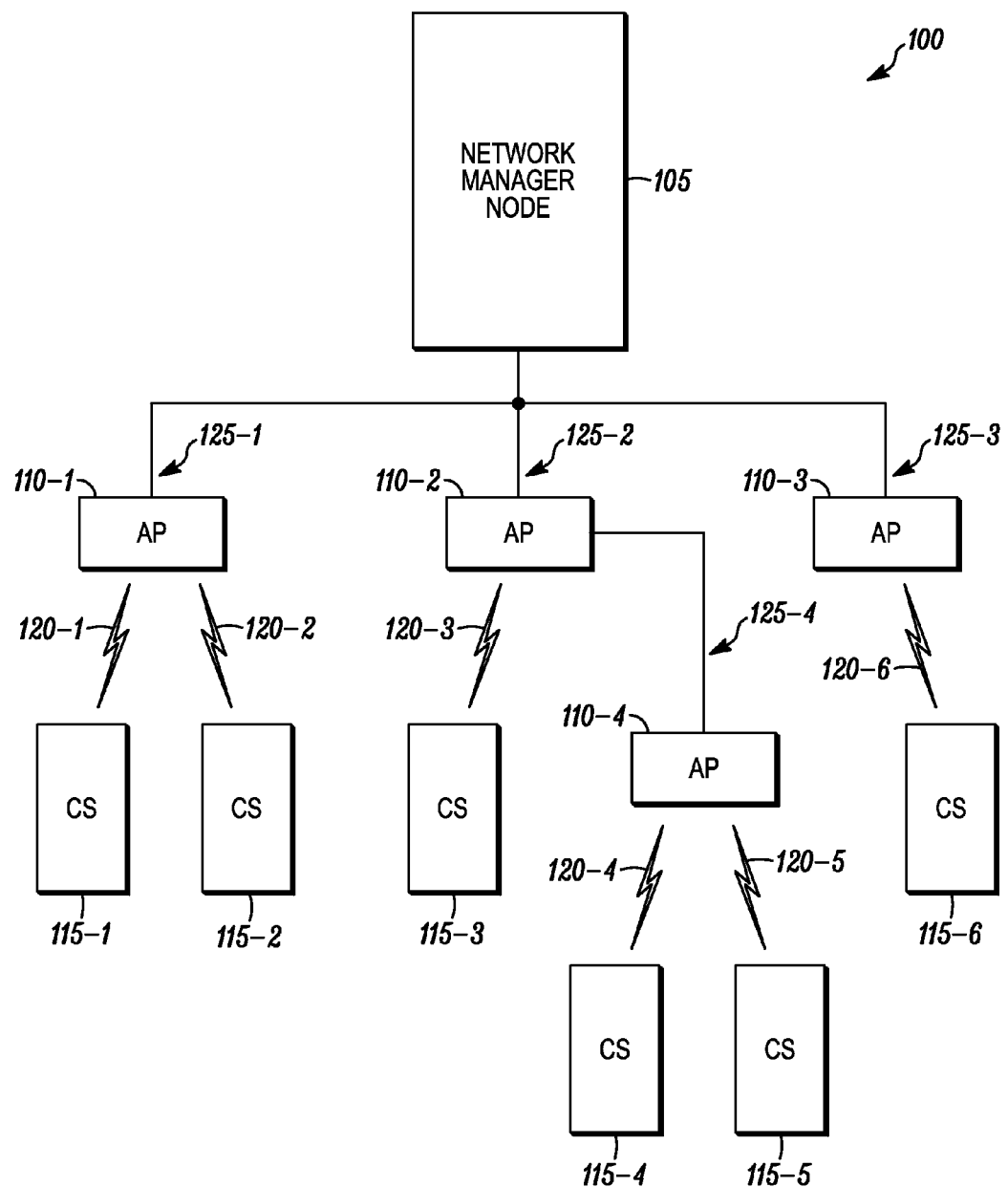
FIG. 1 is a block diagram of a communication system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

A communication system comprises an access point and one or more client stations associated with the access point. The access point maintains a simple network management protocol (SNMP) table including a respective media access control (MAC) address for each of one or more client stations associated with the access point. In accordance with some embodiments, the access point receives a SNMP request message including a MAC address of the client station for which the association is to be identified. The access point then identifies the association of the client station by searching the SNMP table for the MAC address of the client station for which the association is to be identified. Further, the access point sends a reply message identifying the association of the client station with the access point when the SNMP table includes the MAC address of the client station.

FIG. 1 is a block diagram illustrating a communication network 100 employing a method to identify an access point to which a particular client station is currently associated. In accordance with some embodiments, the communication network 100 is an 802.11a/b/g/n mesh network (For these and any Institute of Electrical and Electronics Engineers (IEEE) standards recited herein, see: http://standards.ieee.org/getieee802/index.html or contact the IEEE at IEEE, 445 Hoes Lane, PO Box 1331, Piscataway, N.J. 08855-1331, USA). The communication network 100 includes a network manager node 105 and a plurality of access points 110 (shown as AP 110 in FIG. 1), for example access point 110-1, access point 110-2, access point 105-3, and access point 105-4. The network manager node 105 includes a simple network management protocol (SNMP) manager (not shown) that manages all the access points 110 in the communication network 100. The network manager node 105 uses a SNMP to communicate with the access points 110 and other devices in the communication network 100.

The access points 110 can be, for example, base stations and/or communication nodes that transmit signals to and receive signals from one or more client stations 115 to communicate with one another as well as with other access points in the communication network. In one embodiment, the access points 110 are wireless communication stations installed at a fixed location of the communication network 100. The access points 110 communicate with each other and the network manager node 105 either via wired or wireless communication links 125, for example, communication link 125-1, communication link 125-2, communication link 125-3, and communication link 125-4. The access points 110 communicate with its associated client stations 115 (shown as CS 115 in FIG. 1) via wireless communication links 120. Specifically, the access point 110-1 wirelessly communicates with the client stations 115-1 through 115-2 via wireless communication links 120-1 through 120-2, respectively; the access point 110-2 communicates with the client station 115-3 via wireless communication link 120-3; the access point 110-3 communicates with the client station 115-6 via wireless communication link 120-6; and the access point 110-4 wirelessly communicates with the client stations 115-4 through 115-5 via wireless communication links 120-4 through 120-5, respectively.

The client stations 115 can be, for example, one or more types of communication devices, such as mobile telephones, mobile nodes, radio terminals, and notebook computers and personal digital assistants, or the like with communication capabilities.

In accordance with some embodiments, each access point 110 is configured to maintain a SNMP table that includes a respective media access control (MAC) address for each of the one or more client stations 115 associated with the access point 110. Each access point 110 is further configured to receive a SNMP request message, for example a SNMP request message broadcasted from the network manager node 105. The SNMP request message includes a media access control (MAC) address of a client station 115 for which the association is to be identified. Each access point 110 then searches its respective SNMP table for the MAC address of the client station 115 for which the association needs to be identified. In accordance with some embodiments, only the access point 110 that includes the MAC address of the client station 115 in its SNMP table sends a reply message indicating its association with the client station 115 to the network manager node 105. Further, the network manager node 105 receives the reply message and displays the access point's identifier (to which the client station is currently associated) and other information received in the reply message to the operator for further processing.

Figure 2:
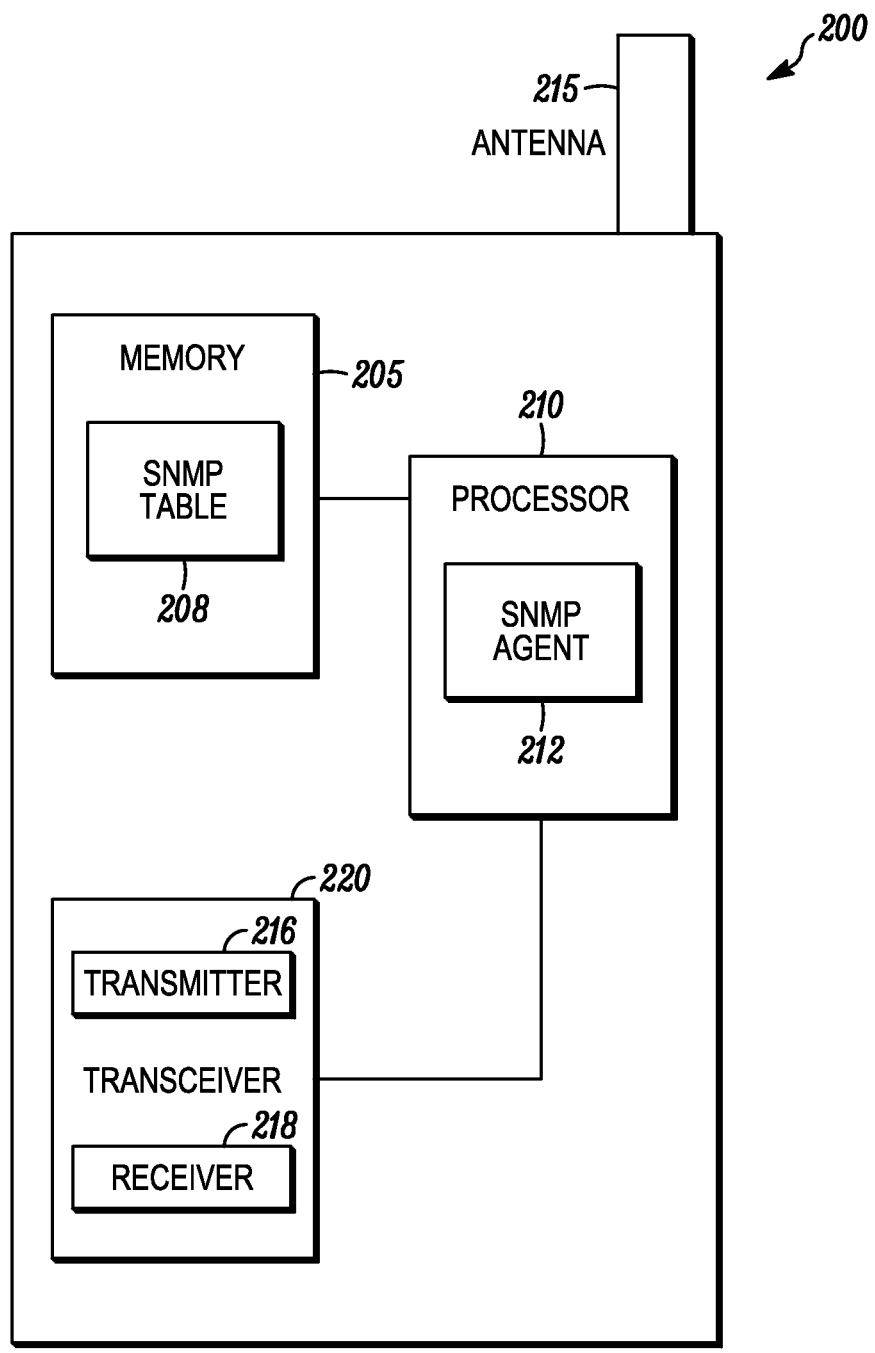
FIG. 2 is a block diagram of a portion of an access point operating in the communication system of FIG. 1 in accordance with some embodiments.

FIG. 2 is a block diagram of at least a portion of an access point in accordance with some embodiments. The portion 200 of the access point may be suitable for use as any one of the access point 110 of the communication network 100 shown in FIG. 1. The portion 200 of the access point includes a memory 205, a processor 210, an antenna 215, and a transceiver 220 including a transmitter circuitry 216 and a receiver circuitry 218. Although not shown, the portion 200 of the access point also can include an antenna switch, duplexer, circulator, or other highly isolative means (not shown) for intermittently providing radio signals from the transmitter circuitry 216 to the antenna 215 and from the antenna 215 to the receiver circuitry 218. The portion 200 of the access point can be an integrated unit containing at least all the elements depicted in FIG. 2, as well as any other elements necessary for the portion 200 of the access point to perform its particular electronic function. Alternatively, the portion 200 of the access point can comprise a collection of appropriately interconnected units or devices, wherein such units or devices perform functions that are equivalent to the functions performed by the elements of the portion 200 of the access point.

The processor 210 includes one or more microprocessors, microcontrollers, DSPs (digital signal processors), state machines, logic circuitry, or any other device or devices that process information based on operational or programming instructions. Such operational or programming instructions are stored in the memory 205. The memory 205 can be an IC (integrated circuit) memory chip containing any form of RAM (random-access memory) or ROM (read-only memory), a floppy disk, a CD-ROM (compact disk read-only memory), a hard disk drive, a DVD (digital video disc), a flash memory card, external subscriber identity module (SIM) card or any other medium for storing non-transitory digital information. One of ordinary skill in the art will recognize that when the processor 210 has one or more of its functions performed by a state machine or logic circuitry, the memory 205 containing the corresponding operational instructions can be embedded within the state machine or logic circuitry. The operations performed by the processor 210 and the other elements of the portion 200 of the access point are described in detail below.

The transmitter circuitry 216 and the receiver circuitry 218 enable the portion 200 of the access point to communicate radio signals to and acquire signals from the client stations 115. In this regard, the transmitter circuitry 216 and the receiver circuitry 218 include appropriate, conventional circuitry to enable digital or analog transmissions over a wireless communication channel. The implementations of the transmitter circuitry 216 and the receiver circuitry 218 depend on the implementation of the portion 200 of the access point. For example, the transmitter circuitry 216 and the receiver circuitry 218 can be implemented as an appropriate wireless modem, or as conventional transmitting and receiving components of two-way wireless communication devices. In the event where the transmitter circuitry 216 and the receiver circuitry 218 are implemented as a wireless modem, the modem can be internal to the portion 200 of the access point or insertable into the portion 200 of the access point (e.g., embodied in a wireless radio frequency (RF) modem implemented on a Personal Computer Memory Card International Association (PCMCIA) card). For a wireless communication device, the transmitter circuitry 216 and the receiver circuitry 218 are implemented as part of the wireless device hardware and software architecture in accordance with known techniques. One of ordinary skill in the art will recognize that most, if not all, of the functions of the transmitter circuitry 216 and/or the receiver circuitry 218 can be implemented in a processor, such as the processor 210. However, the processor 210, the transmitter circuitry 216, and the receiver circuitry 218 have been artificially partitioned herein to facilitate a better understanding.

The receiver circuitry 218 is capable of receiving a SNMP request message from a network manager node 105. The transmitter circuitry 216 is capable of transmitting a reply message to the network manager node 105.

As illustrated in FIG. 2, the memory 205 stores a SNMP table 208. The SNMP table 208 includes a respective media access control (MAC) address for each of the one or more client stations 115 currently associated with the access point 110, for example the access point 110-1. The SNMP table 208 further includes, for each of the one or more client stations 110 currently associated with itself: an identifier (for example the name or the MAC address), an operational state, a virtual local area network identifiers, a service set identifier, an identifier (for example the name or the MAC address) of a parent device, a current version of firmware.

As illustrated in FIG. 2, the processor 210 includes an SNMP agent 212. The SNMP agent 212 is configured to maintain the SNMP table 208 stored in the memory 205. Whenever a new client station is associated with the access point 110, the SNMP agent 212 adds the MAC address and other information of the newly associated client station in the SNMP table 208. Also, the SNMP agent 212 removes the MAC address and other information of the client station 115 that is no longer associated with the access point 110 from the SNMP table 208. The SNMP agent 212 indexes the SNMP table 208 by the MAC address for each of the one or more client stations 115 associated with the access point 110. The SNMP agent 212 is further configured to search its SNMP table 208 for the MAC address of the client station 115 for which the association is to be identified. The SNMP agent 212 determines its association with the client station 115 when the SNMP table 208 is found to include the MAC address of the client station 115 for which the association is to be identified. In accordance with some embodiments, the SNMP agent 212 constructs a reply message to indicate its association with the client station 115 and instructs the transmitter circuitry 216 to transmit the reply message to the network manager node 105. In accordance with other embodiments, the SNMP agent 212 enables the transmitter circuitry 216 to refrain from sending any message to the network manager node 105, when the SNMP table 208 does not include the MAC address of the client station 115 for which the association is to be identified.

Figure 3:
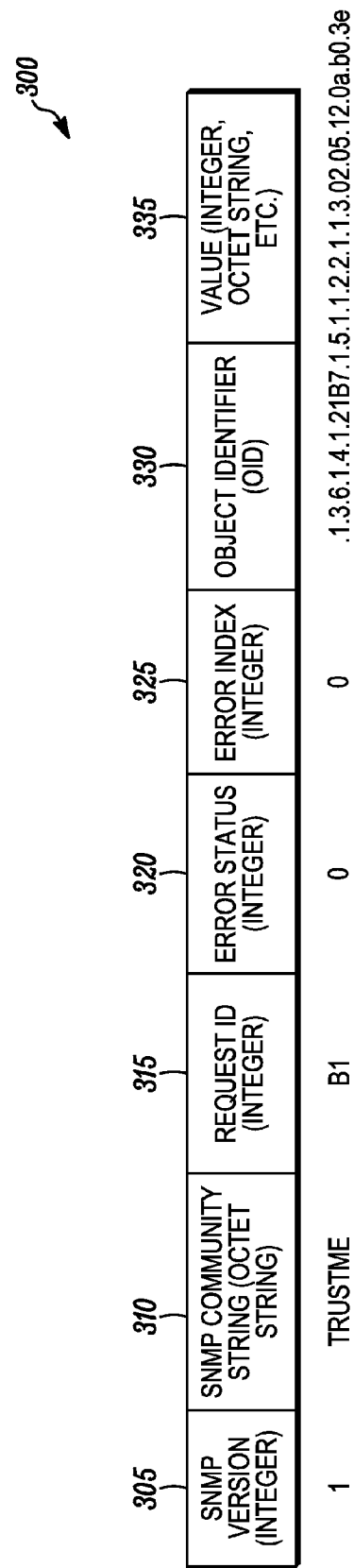
FIG. 3 illustrates an example structure of a simple network management protocol (SNMP) request message in accordance with some embodiments.

FIG. 3 illustrates a structure of a SNMP request message 300 broadcasted by the network manager node 105 in accordance with some embodiments. The format shown in FIG. 3 is used to request the access points to identify the association of a client station 115. In accordance with one embodiment, the structure of the SNMP request message 300 is divided into seven (7) fields namely a SNMP Version 305, a SNMP Community String 310, a Request ID 315, an Error Status 320, an Error Index 325, an Object Identifier 330, and a Value 335. The SNMP Version 305 represents an integer that identifies the version of SNMP request message 300. The SNMP Community String 310 is an octet string that may contain a string used to add security to the access points 110 in the communication network 100. This octet string acts as a password to control access to the SNMP table 208 of the access points 110. The Request ID 315 represents an integer that identifies a particular SNMP request message 300 for identifying an association of the client station 115. This integer that identifies the particular SNMP request message 300 is used to correlate the SNMP request message and its reply from the access points 110 because the network manager node 105 can send a plurality of SNMP request messages 300 at the same time. The Error Status 320 is an integer set used to indicate if communication of the SNMP request message 300 for identifying an access point 110 to which a particular client station 115 is associated was successful or not. The SNMP agent 212 of the access point 110 places an error code in this field in the reply message if an error occurred processing the SNMP request message. The Error Index 325 holds a pointer to a variable in the SNMP request message 300 that caused problem. The Object Identifier 330 points to a particular parameter in the SNMP agent 212. The Value 335 represents the MAC address of the client station 115 for which the association needs to be identified. In one example, for illustration purposes only, the value of the SNMP Version in the SNMP request message is 1, the SNMP Community String is "trustme", the Request Identifier (ID) is b1, the Error status is 0, the Error Index is 0, the requested Object is mnDot1RadioEntryState, the Object Identifier is 1.3.6.1.4.1.21B7.1.5.1.1.2.2.1.1.3, and the client device MAC address (for which the association is to be identified) is 02.05.12.0a.b0.3e.

Figure 4:
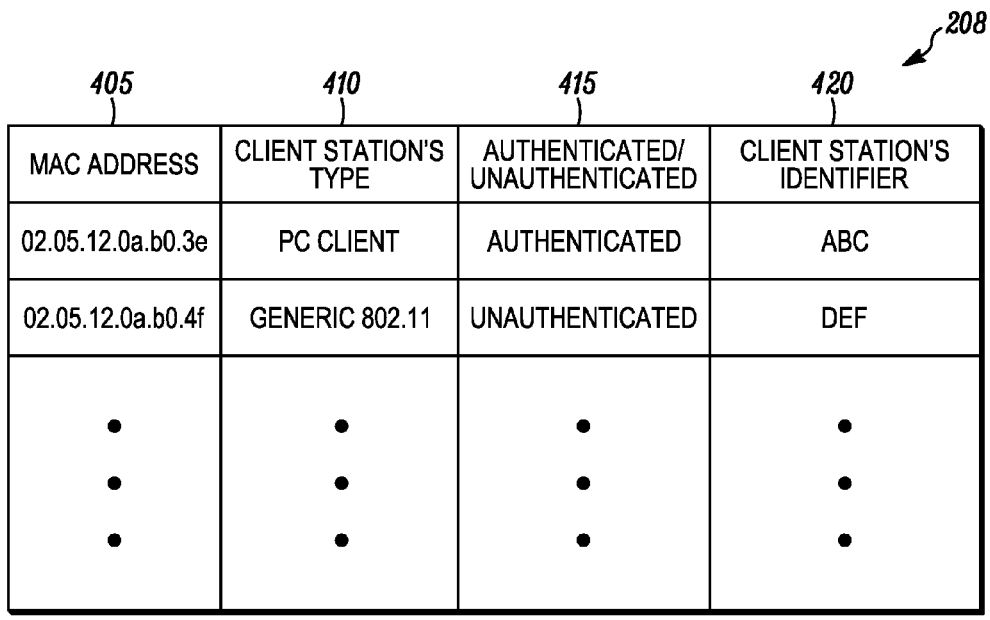
FIG. 4 illustrates an example structure of a simple network management protocol (SNMP) table maintained by the access point in accordance with some embodiments.

FIG. 4 illustrates a structure of a SNMP table 208 maintained by the access point 110 as shown in FIG. 2. The format shown in FIG. 4 is used by each access point 110 to store information of the client stations 115 associated with the respective access point 110. The SNMP table 208 is divided into a plurality of fields that contains information regarding each of the one or more client stations 115 currently associated with the access point 110. The SNMP table 208 includes a MAC address of each of the one or more client stations 115 currently associated with the access point 110. Although not shown, the SNMP table 208 can include, for each of the one or more client stations 110 associated with itself: an identifier (for example the name and the MAC address), an operational state, a virtual local area network identifiers, a service set identifier, an identifier of a parent device, a current version of firmware. Further, the SNMP table 208 returns a single true or false bit when accessed by the SNMP agent 212 for any required information. In one embodiment, the SNMP table 208 maintained at the access point 110-1 stores information regarding the client stations 115-1 and 115-2. Similarly, the SNMP table 208 maintained at the access point 110-4 stores information regarding the client stations 115-4 and 115-5.

The SNMP table 208 is indexed with the MAC address of each of the one or more client stations 115 currently associated with the respective access points 110. In accordance with some embodiments, such indexing of the SNMP table 208 with the MAC address of the client stations 115, simplifies the search request method as the SNMP agent 212 can directly look for the MAC address of the client station 115 (for which the association is to be identified) in the index of the SNMP table 208. In one embodiment of the SNMP table 208, the SNMP table 208 is divided into four fields namely the MAC address field 405, the client station's type field 410, authenticated/unauthenticated field 415, and the client station's identifier field 420. In this example, as shown in FIG. 4, the MAC address of one of the client stations 115 currently associated with the access point 110 is 02.05.12.0a.b0.3e, the type of the client station 115 currently associated with the access point 110 is a personal computer (PC) client, the authenticate/unauthenticated field is authenticated, and the identifier of the client station 115 currently associated with the access point 110 is ABC.

Figure 5:
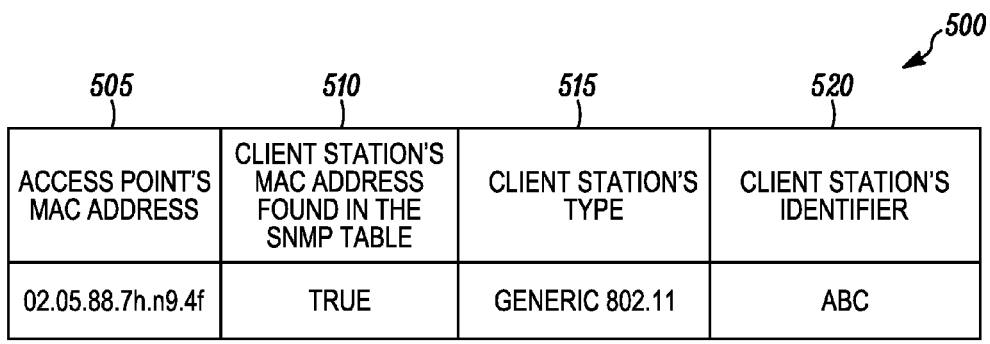
FIG. 5 illustrates an example structure of a reply message in accordance with some embodiments.

FIG. 5 illustrates a structure of a reply message 500 transmitted by one of the access points 110 in response to identifying its association with the client station 115 (for which the association is to be identified). The structure of the reply message 500 is divided into one or more fields namely the access point's identifier (for example the access point's MAC address) and a field for returning value of "true" to indicate that the client station (for which the association is to be identified) is associated with the access point 110. Although not shown, the reply message may also include one or more information regarding the client station 115 (for which the association is to be identified) stored in the SNMP table of the access point 110 to which the client station 115 is currently associated. In accordance with some embodiments, the reply message 500 may also include a field for returning value of "false" to indicate the non-association of the access point 110 with the client station 115 (for which the association is to be identified), when the SNMP table 208 of the access point 110 does not include the MAC address of the client station 115 for which the association is to be identified. In accordance with one embodiment, the reply message 500 is divided into four fields namely the access point's MAC address field 505, the client station's MAC address found in the SNMP table field 510, the client station's type field 515, and the client station's identifier field 520.

Figure 6:
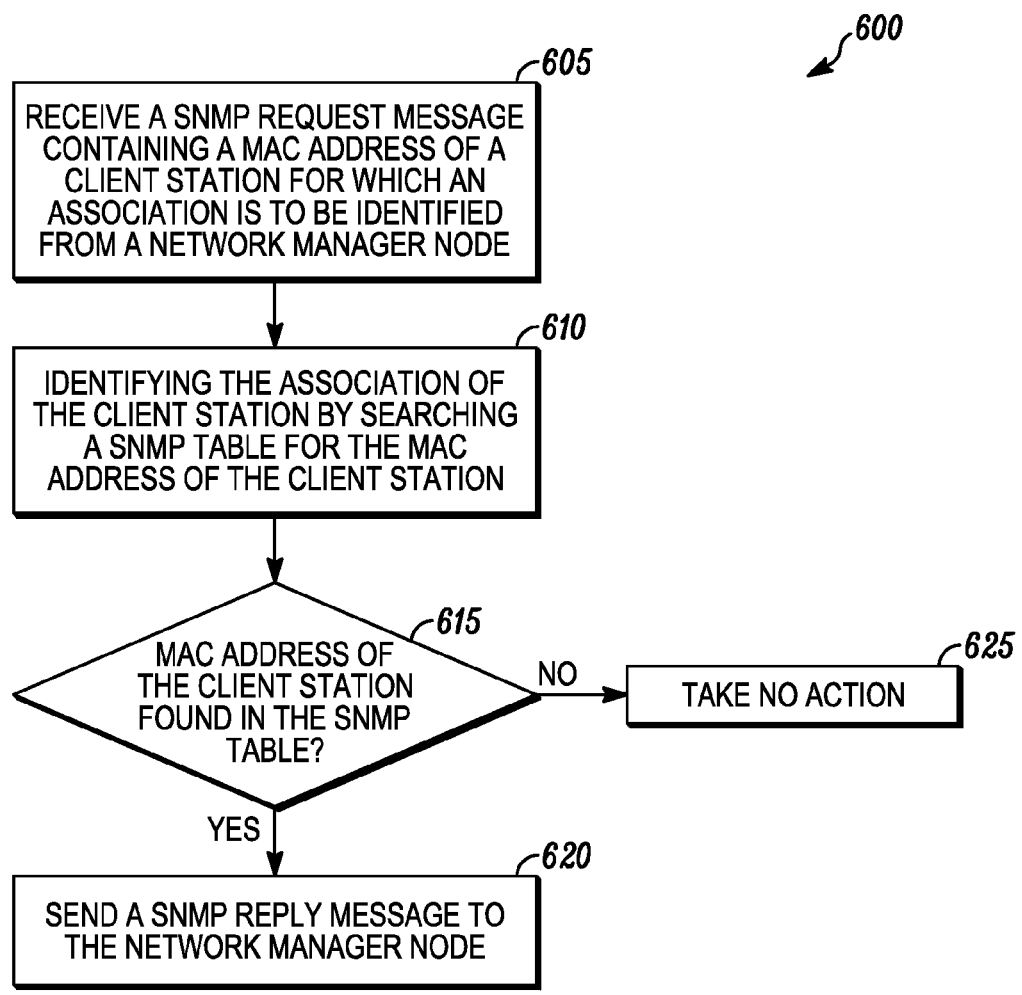
FIG. 6 is a flowchart of a method for identifying an association of a client station by an access point operating in the communication system of FIG. 1 in accordance with some embodiments.

FIG. 6 is a flowchart of a method 600 for identifying an association of a client station 115 by an access point 110 in the communication network 100 in accordance with some embodiments. The method 600 begins at 605 with an access point 110 receiving a simple network management protocol (SNMP) request message 300 from a network manager node 105 to identify the association of the client station 115, for example the client station 115-3. In one example, the access point 110-2 receives the SNMP request message 300 from the network manager node 105 to identify an association of the client station 115-3. The SNMP request message 300 contains, but is not limited to, the MAC address of the client station 115-3 for which the association is to be identified. In accordance with some embodiments, the SNMP request message 300 is propagated throughout the communication network 100, so that every access point 110 in the communication network 100 receives the SNMP request message 300. In one embodiment, every access point 110 in the communication network 100 is configured to broadcast the received SNMP request message 300 to the other access points 110 in the communication network 100 that are not directly connected to the network manager node 105. For example, the access point 115-2 broadcasts the received SNMP request message 300 to the access point 110-4, so that the access point 110-4 can also search its SNMP table 208 for the MAC address of the client station 115-3 (for which the association is to be identified).

Next, at 610, the access point 110-2 identifies its association by searching its SNMP table 208 for the MAC address of the client station 115-3 for which the association is to be identified. As discussed previously herein, each access point 110 in the communication network 100 maintains the SNMP table 208 which includes the MAC address and other information regarding one or more client stations 115 currently associated with itself (the access point 110). Next, at 615, the access point 110-2 determines whether the MAC address of the client station 115-3 for which the association is to be identified is included in the SNMP table 208. If the SNMP table 208 includes the MAC address of the client station 115-3 for which the association is to be identified, then the access point 110-2 sends a reply message 500 to the network manager node 105 at 620. The reply message 500 includes the MAC address of the access point 115-2 and a returned value of "true" to indicate the association of the client station 115-3 with the access point 110-2. In one embodiment, a bit is set to one (1) or zero (0) to indicate the value of "true." Returning back to 615, if the MAC address of the client station 115-3 for which the association is to be identified is not included in the SNMP table 208 of the access point 110-2, then the access point 110-2 does not send any reply message to the network manager node 105 at 625. In accordance with an alternate embodiment, (not shown) the access point 110-2 sends a reply message with a returned value of "false" to indicate its non-association with the client station 115-3 (for which the association is to be identified), when the SNMP table 208 of the access point 110-2 does not include the MAC address of the client station 115-3 (for which the association is to be identified). In one embodiment, a bit is set to one (1) or zero (0) to indicate the value of "false."

Figure 7:
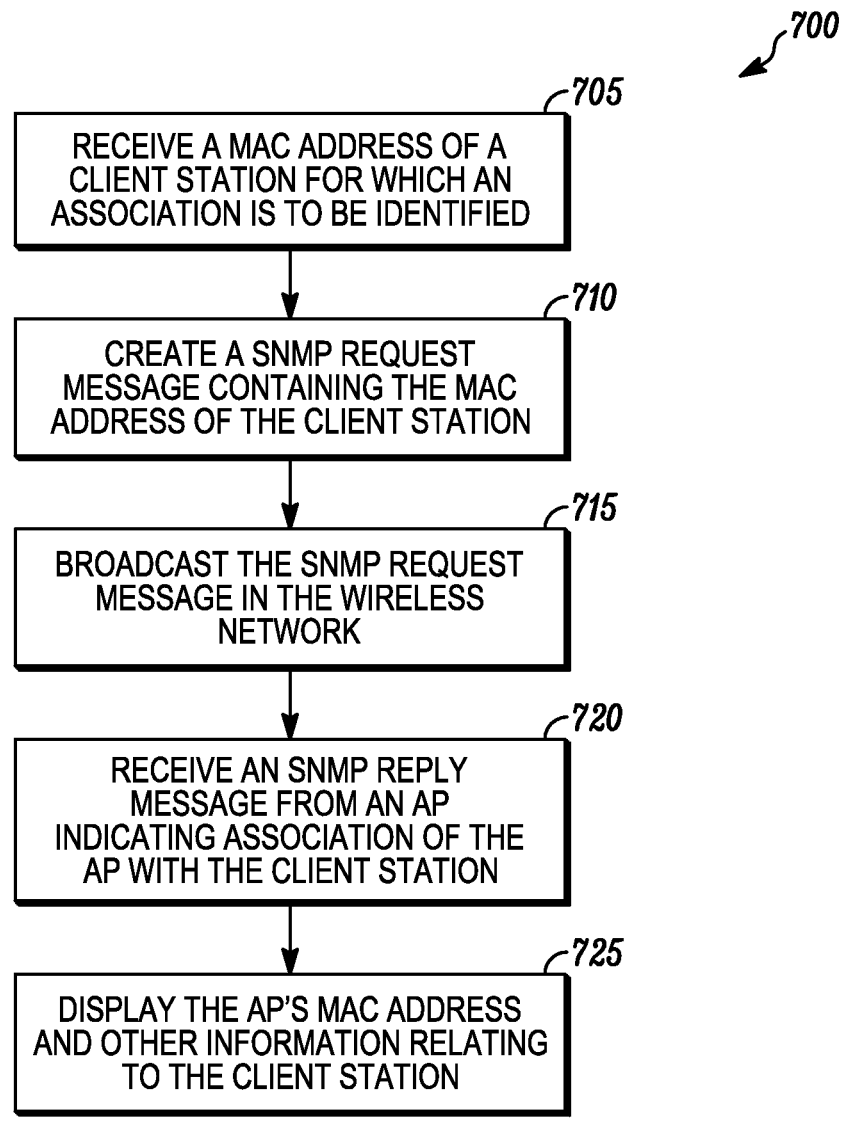
FIG. 7 is a flowchart of a method for identifying an association of a client station by a network manager node operating in the communication system of FIG. 1 in accordance with some embodiments.

FIG. 7 is a flowchart of a method 700 for identifying an association of a client station 115 by a network manager node 105 in the communication network 100 in accordance with some embodiments. The method 700 begins at 705 with a network manager node 105 receiving a request from a client/customer to identify a client station 115. The request includes the MAC address of the client station 115 for which the association is to be identified. Next, at 710, the network manager node 105 creates a SNMP request message 300 containing, but not limited to, the MAC address of the client station 115 for which the association is to be identified. In one example, the SNMP request message 300 includes a SNMP version of the SNMP message, a SNMP community string, a request identifier, an error status, an error index, an object identifier, and a value of a parameter pointed by the object identifier. The network manager node 105 further broadcasts the SNMP request message 300 in the communication network 100 at 715. After broadcasting the SNMP request message 300, the network manager node 105, at 720, receives a reply message 500 from an access point 110 in the communication network indicating its association with the client station 115 (for which the association is to be identified). The reply message 500 includes an identifier of the access point 110 that identifies its association with the client station 115 (for which the association is to be identified). One of ordinary skill in the art would appreciate that the identifier of the access point 110 can be a MAC address of the access point 110, a name of the access point 110 or any other unique number identifying the access point 110.

At 725, the network manager node 105 displays the identifier of the access point 110 to which the client station 115 (for which the association is to be identified) is currently associated. In accordance with some embodiments, the network manager node 105 displays information included in the SNMP table 208 regarding the client station 115 for which the association is identified. Such information includes, for each of the one or more client stations associated with itself: an identifier (for example the name and the MAC address), an operational state, a virtual local area network identifiers, a service set identifier, an identifier of a parent device, a current version of firmware.

The communication network 100 can be operatively utilized to locate a fire service personnel operating at an emergency response site from the MAC address of a client station carried by the fire service personnel. The communication network 100 can further be operatively utilized for tracking a visitor client station performing malicious activities in the communication network 100. It will be appreciated by those of ordinary skill in the art that the examples of utilizing the network in accordance with some embodiments are solely for illustrative purposes only, and that there are many other useful examples of utilizing the claimed embodiments.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, or article that comprises, has, includes, contains a list of elements does not include only those elements but may include other elements not expressly listed or inherent to such process, method, or article. An element proceeded by "comprises . . . a", "has . . . a", "includes . . . a", "contains . . . a" does not, without more constraints, preclude the existence of additional identical elements in the process, method, or article that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A method for identifying an association of a client station with an access point in a communication network, the method comprising:

maintaining, by the access point, a simple network management protocol (SNMP) table including a respective media access control (MAC) address for each of one or more client stations associated with the access point;

receiving, by the access point, a SNMP request message including a MAC address of the client station for which the association is to be identified;

identifying the association of the client station, by the access point, by searching the SNMP table for the MAC address of the client station for which the association is to be identified; and sending, by the access point, a reply message identifying the association of the client station with the access point when the SNMP table includes the MAC address of the client station.

2. The method of claim 1, wherein the SNMP request message comprises a broadcasted SNMP request message.

3. The method of claim 1, further comprises:

refraining, by the access point, from sending a reply message when the SNMP table does not include the MAC address of the client station for which the association is to be identified.

4. The method of claim 1, wherein the maintaining the SNMP table further comprises:

indexing, by the access point, the SNMP table by the MAC address for each of the one or more client stations associated with the access point.

5. The method of claim 1, wherein the SNMP table further includes information comprising for each of the one or more client stations, at least one of an identifier of the client station associated with the access point, an operational state of the client station associated with the access point, a virtual local area network identifiers of the client station associated with the access point, a service set identifier of the client station associated with the access point, an identifier of a parent device of the client station associated with the access point, a current version of firmware on the client station associated with the access point.

6. The method of claim 1, wherein the SNMP request message further comprises information relating to a SNMP version of the SNMP message, a SNMP community string, a request identifier, an error status, an error index, an object identifier, and a value of a parameter pointed by the object identifier.

7. The method of claim 1, wherein the reply message further comprises a returned value of true to indicate that the client station is associated with the access point and an identifier of the access point.

8. A communication network operating to identify an association of a client station with an access point, the communication network comprising:

a plurality of access points, wherein each access point maintains a simple network management protocol (SNMP) table including a respective media access control (MAC) address for each of one or more client stations associated with the access point; and a network manager node in communication with the plurality of access points, wherein the network manager node is configured to broadcast a SNMP request message for identifying the association of the client station, wherein the SNMP request message includes a MAC address of the client station for which the association is to be identified, and receive a reply message indicating the association of the client station with an access point, wherein the reply message contains a MAC address of the access point associated with the client station, and further wherein each access point is configured to:

receive the SNMP request message from the network manager node;

identify the association of the client station with the access point by searching the SNMP table for the MAC address of the client station for which the association is to be identified; and send a reply message identifying the association of the client station with the access point to the network manager node when the SNMP table includes the MAC address of the client station, wherein the reply message contains a MAC address of the access point.

9. The method of claim 8, wherein the SNMP request message comprises a broadcasted SNMP request message.

10. The system of claim 8, wherein each access point is further configured to:

refrain from sending a reply message when the SNMP table does not include the MAC address of the client station for which the association is to be identified.

11. The system of claim 8, wherein each access point is configured to maintain the SNMP table by indexing the SNMP table by the MAC address for each of the one or more client stations associated with the access point.

12. The system of claim 8, wherein the SNMP table maintained at each access point further includes information comprising for each of the one or more client stations associated with the access point, at least one of an identifier of the client station associated with the access point, an operational state of the client station associated with the access point, a virtual local area network identifiers of the client station associated with the access point, a service set identifier of the client station associated with the access point, an identifier of a parent device of the client stations associated with the access point, a current version of firmware on the client station associated with the access point.

13. The system of claim 8, wherein the SNMP request message further comprises information relating to a SNMP version of the SNMP message, a SNMP community string, a request identifier, an error status, an error index, an object identifier, and a value of a parameter pointed by the object identifier.

14. The system of claim 8, wherein the reply message further comprises a returned value of true to indicate that the client station is associated with the access point and an identifier of the access point.

15. An access point capable of identifying an association of a client station in a communication network, the access point comprising:

a simple network management protocol (SNMP) agent configured to maintain a SNMP table including a respective media access control (MAC) address for each of one or more client stations associated with the access point, identify the association of the client station with the access point by searching the SNMP table for a MAC address of the client station for which the association is to be identified; and a transceiver communicatively coupled to the SNMP agent, the transceiver configured to receive a SNMP request message including the MAC address of the client station for which the association is to be identified, and transmit a reply message identifying the association of the client station with the access point when the SNMP table includes the MAC address of the client station, wherein the reply message contains a MAC address of the access point.

16. The method of claim 15, wherein the SNMP request message comprises a broadcasted SNMP request message.

17. The access point according to claim 15, wherein the SNMP agent is further configured to:

refrain from sending a reply message when the SNMP table does not include the MAC address of the client station for which the association is to be identified.

18. The access point according to claim 15, wherein the SNMP agent is further configured to maintain the SNMP table by indexing the SNMP table by the MAC address for each of the one or more client stations associated with the access point.

19. The access point according to claim 15, wherein the SNMP request message further comprises information relating to a SNMP version of the SNMP message, a SNMP community string, a request identifier, an error status, an error index, an object identifier, and a value of a parameter pointed by the object identifier.

20. The access point according to claim 15, wherein the reply message further comprises a returned value of true to indicate that the client station is associated with the access point and an identifier of the access point.

* * * * *